July 22, 1952  M. E. BUEHLER  2,604,527
MEASUREMENT OF DISPLACEMENT
Filed May 2, 1950  4 Sheets-Sheet 2
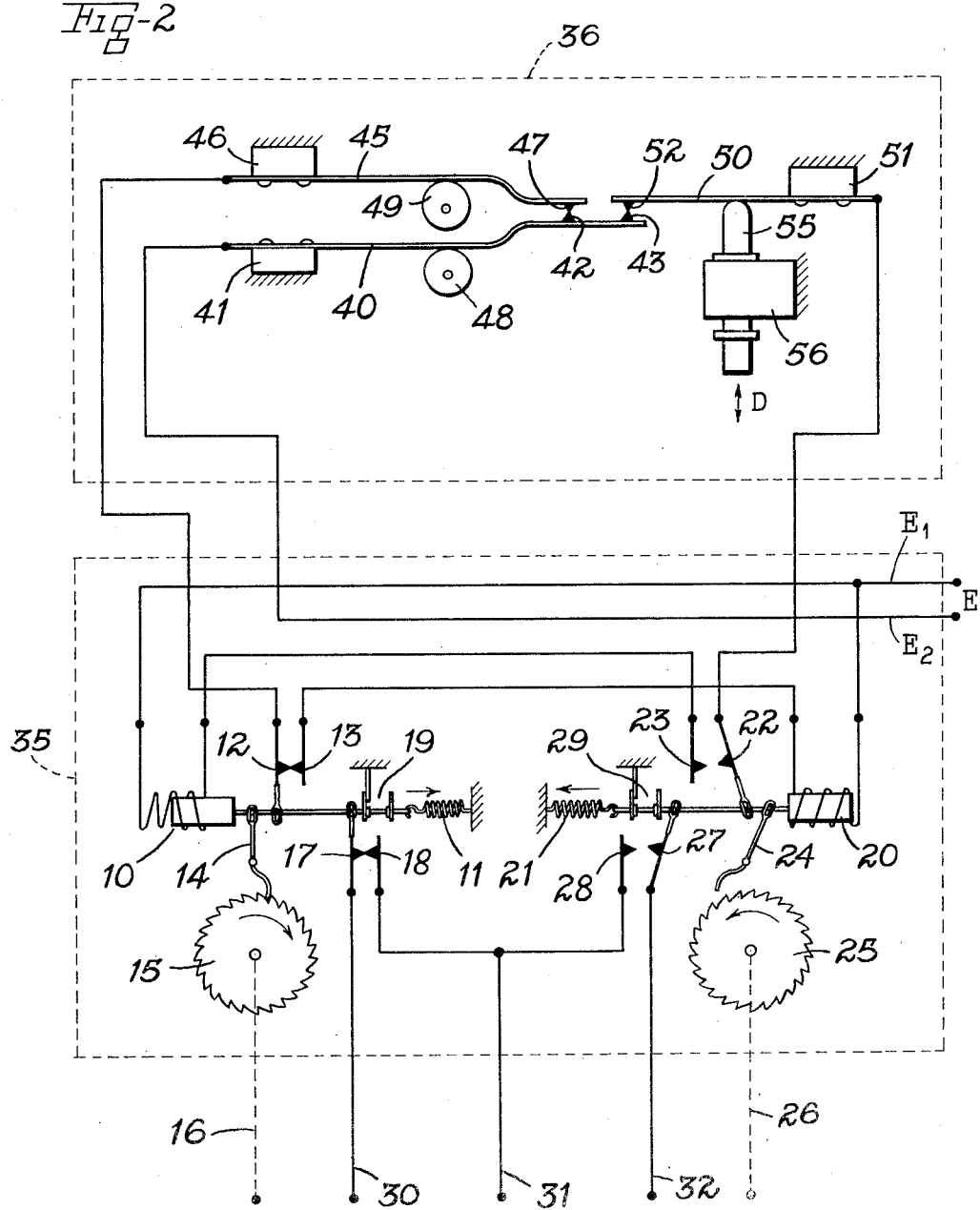
INVENTOR.
BY MAURICE E. BUEHLER
Marechal Biebel
ATTORNEYS

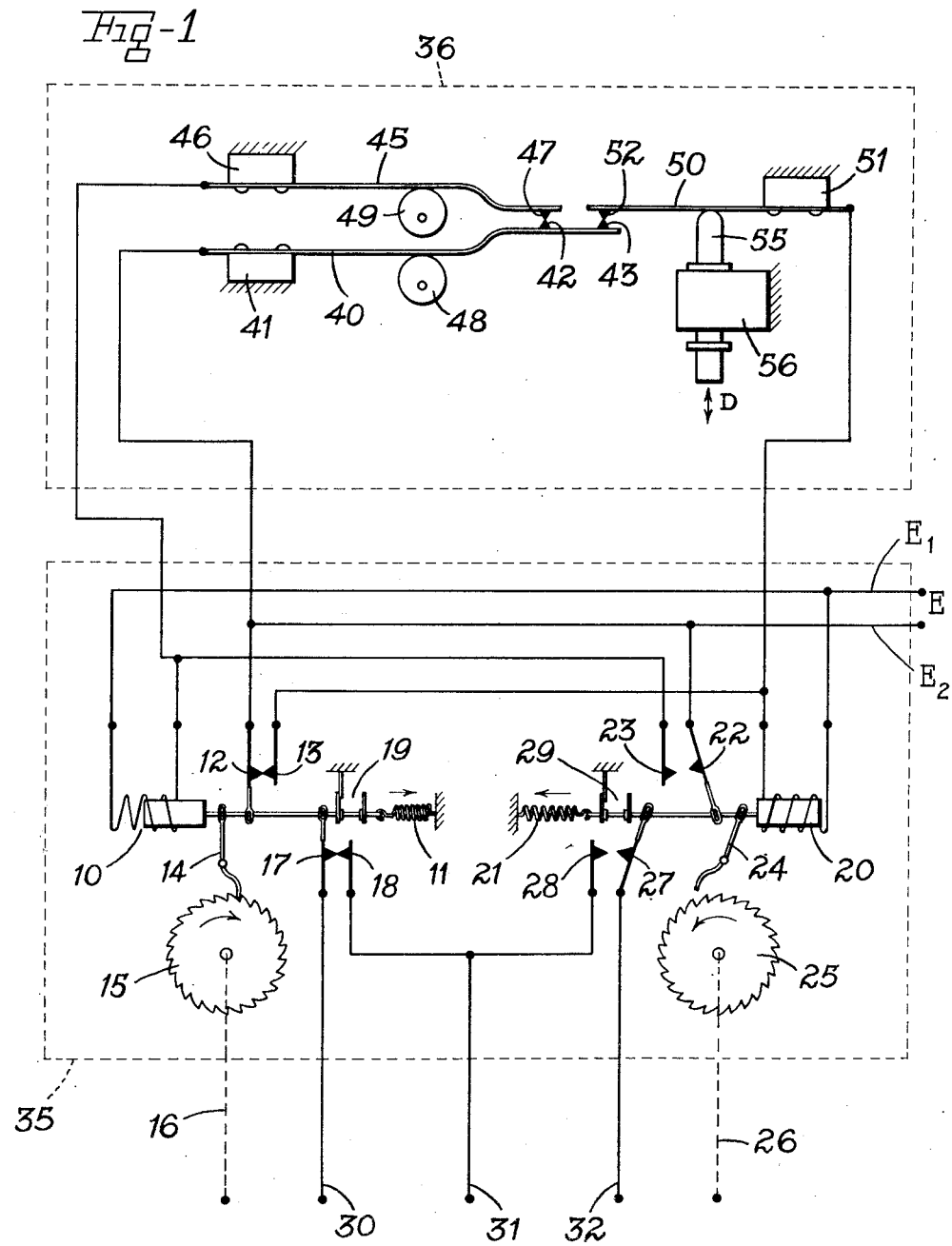

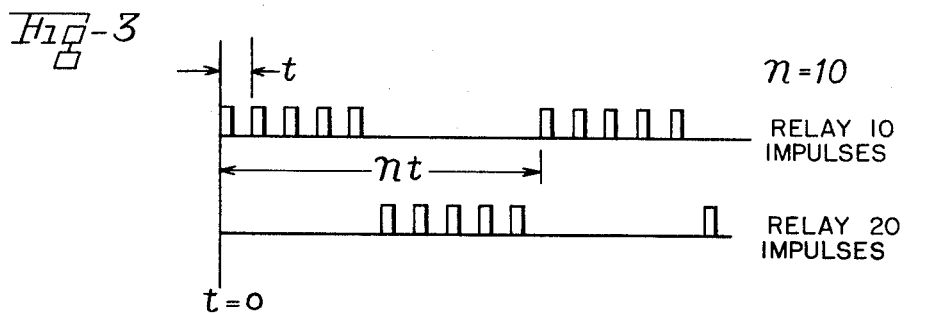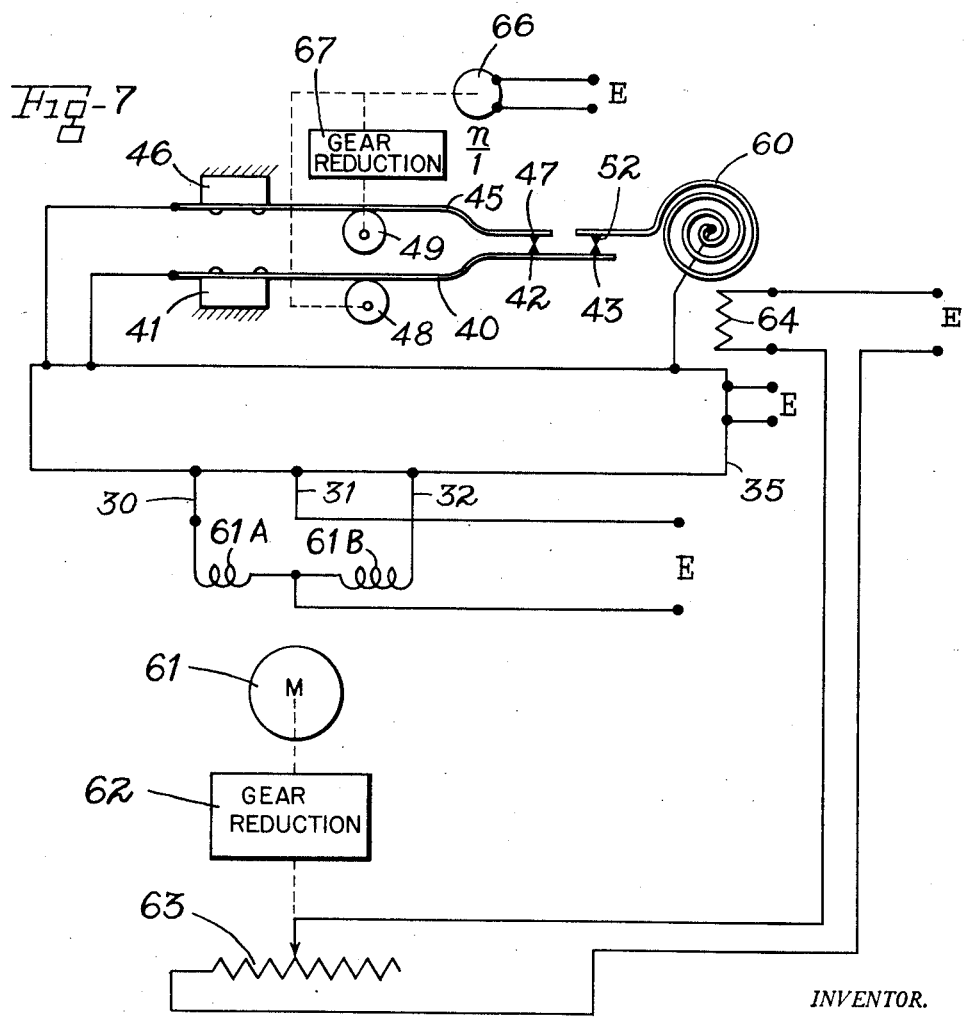

July 22, 1952 M. E. BUEHLER 2,604,527
MEASUREMENT OF DISPLACEMENT
Filed May 2, 1950 4 Sheets-Sheet 4
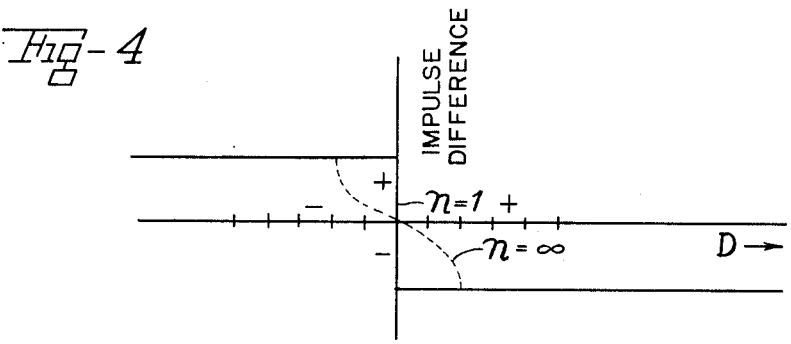
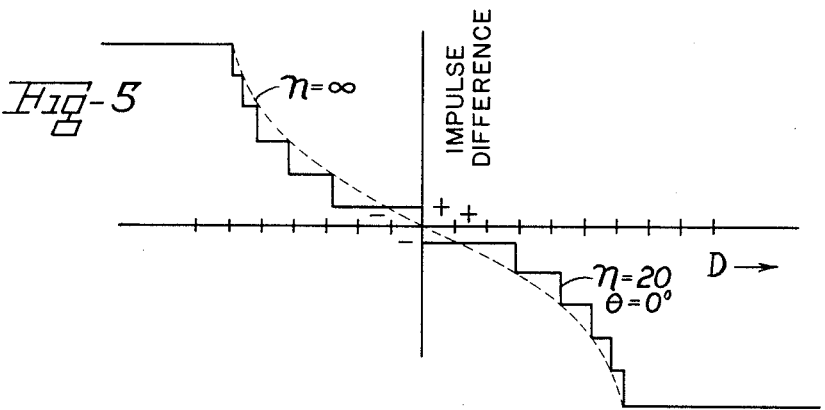
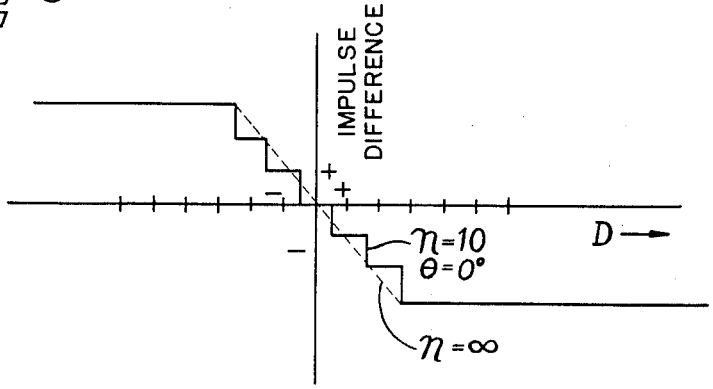
INVENTOR.
BY MAURICE E. BUEHLER
Marechol & Biebel
ATTORNEYS Patented July 22, 1952

2,604,527

UNITED STATES PATENT OFFICE 2,604,527

MEASUREMENT OF DISPLACEMENT

Maurice E. Buehler, Dayton, Ohio

Application May 2, 1950, Serial No. 159,636

13 Claims. (Cl. 177—351)

This invention relates to an electro-mechanical apparatus for the detection and measurement of the direction and magnitude of displacement of an element. It is a particular object of the invention to provide apparatus having a high degree of flexibility and accuracy in achieving the optimum correlation between displacement resolution, delineated displacement range and time utilization. The data from the apparatus, which is supplied as the difference in number of impulses during a specific time interval from two separate channels, may be made to change in a predictable manner from an absence of impulses in one channel to an absence of impulses in the other channel as the displacement varies from one end of the delineated displacement region to the other, equality of impulses in the two channels during a particular time interval indicating the arbitrary zero displacement condition.

The apparatus consists essentially of a bistable electro-magnetic relay circuit, which is periodically forced to a reference condition by two pairs of contacts driven by an auxiliary prime mover. The displacement to be measured is introduced in such a manner as to affect the differential time relation between the opening and closing of the two pairs of contacts which sets up a preference state of stability sought by the bi-stable circuit.

The bi-stable relay circuit consists of two relays each with a set of contacts which in one embodiment are normally closed when the relay is deenergized. The contacts on the first relay are connected in series with the coil of the second relay and the source of potential, so that if the first relay is energized, its contacts deenergize the second relay. The contacts of the second relay are connected in series with the coil of the first relay and the source of potential, so that if the second relay is energized, its contacts deenergize the first relay. It will be seen that in the circuit thus constructed, at the instant of application of potential, the circuit is in condition for closure of both relays, but if both close, both are deenergized. The circuit therefore assumes a state of stability with one relay closed and one open, for which condition there are no forces and no stored energy to produce further activity in the circuit. It will be further seen that if both relays are in all respects identical electrically and physically, each relay possesses the same probability of assuming circuit control after application of potential.

Two pairs of electrical contacts not associated with the relay motions are electrically connected in series or parallel with the relay contacts, and caused to open and close periodically by an auxiliary movable device. The function of these additional driven contacts is periodically to set the relay circuit to a condition of position in which the relay armatures occupy corresponding positions. In the series connection case, this position is the deenergized armature position. In the parallel connection case, this position is the energized position of the relay armatures.

The driven contacts are arranged in pairs, one of which develops a reference signal and the other a displacement signal, from the point of view of the relative closing and opening times of these contact pairs, and they are specially mounted with respect to a reference frame. One contact of each pair is mounted to an intermediate member, which is periodically displaced by the movable device. The other contact of the displacement signal pair is controlled in its position with respect to the reference frame by the displacement to be measured, and the other contact of the reference signal pair is fixed at any one time instant with respect to the reference frame. It is therefore seen that the instant of closure and opening of the displacement signal contacts may be altered with respect to the reference signal contacts by the displacement introduced into one contact of the displacement signal pair.

Connection of one pair of driven contacts in parallel or series with one pair of relay contacts, and the other pair of driven contacts in parallel or series with the other relay contacts therefore results in the bi-stable relay circuit being periodically reset to a condition of armature position identity, after which the differential opening or closing time of the reference and displacement contacts during their periodic motion introduces a preference as to which relay will assume control. The result is a time series of impulses or "decisions" as to the direction of displacement from a reference position, one operation of the first relay being equivalent to one decision that the displacement being measured lies on one side of the reference position, and one operation of the other relay being equivalent to one decision that the displacement being measured lies on the other side of the reference position.

It is thus seen that one relay is a source of decisions of one type, and the other a source of decisions of the opposite type, and each decision contains quantitative information only to the extent that the displacement lies on one side or the other of a reference position. By maintaining identity of the periodic motions and materials of the reference and displacement contact pairs, and the identity of the relays previously referred to, a high sensitivity may be obtained in detecting very small displacements from a reference position by averaging a large number of decisions.

When the reference contact of the reference pair is displaced with respect to the reference frame in accordance with a function of time having a much larger period than that function displacing the intermediate member, a different mode of operation is produced in which the apparatus is capable of defining the displacement being measured over the total range of displacement of the reference contact, as will be described later.

It is therefore the principal object of the invention to provide apparatus for precision gauging in which the output impulses are used to actuate a suitable indicator calibrated directly in dimensional quantities, or for dimensional control in industrial processes wherein the output impulses are fed through suitable transfer devices to directly control the operation.

It is also an object to provide such an apparatus in which physical states, including temperature, pressure, humidity and others, may be transformed into an equivalent displacement which may be measured and controlled quickly and accurately and in which the direct production by the apparatus of data related to the time integral of displacement may be used to advantage in energy storage and transfer control applications.

Other objects, applications, and advantages will be apparent from the following description, the accompanying drawings, and the appended claims.

In the drawings:

Fig. 1 shows schematically an embodiment of the apparatus of the invention;

Fig. 2 shows a modified form of the circuit of Fig. 1;

Fig. 3 shows a typical time series of impulses;

Fig. 4 is a diagram showing the output characteristics for one mode of operation;

Fig. 5 is a diagram showing the output characteristics for another mode of operation;

Fig. 6 is a diagram showing another output characteristic for the same mode of operation as Fig. 5; and Fig. 7 is a circuit diagram showing a specific application of the invention for measurement and control of temperature.

Referring to Fig. 1, relay 10 biased toward the right as shown by spring 11 has contacts 12 and 13, which are normally closed when the relay is not energized, connected in series between the coil of relay 20 and one terminal $E_2$ of a voltage source E. The other end of the coil of relay 20 is directly connected to the other terminal $E_1$ of the voltage source. Relay 20 is biased toward the left as shown by spring 21 and has a similar set of contacts 22 and 23 connected between the coil of relay 10 and terminal $E_2$ of the voltage source. Double ended stops 19 and 29 are provided to limit the travel of relays 10, 20 respectively. These connections produce a bi-stable circuit in which both relays can neither be closed nor open at the same time, but two conditions of stability exist. One stable condition is when relay 10 is closed, i. e., is deenergized and relay 20 is energized and its contacts open, as shown; the other is when the situation is reversed. The armature of relay 10 is connected by arm 14 to a ratchet wheel 15 which turns output shaft 16, thereby producing a displacement signal. Relay 20 is similarly connected by arm 24 to ratchet wheel 25 which turns output shaft 26, also producing a displacement signal. The direction of rotation of the ratchet wheels is preferably such that a tooth is advanced during pull-in of the relay armatures, in order to obtain minimum loading of the armatures during drop-out motion under the action of springs 11 and 21 respectively.

Contacts 17 and 18 on relay 10 and contacts 27 and 28 on relay 20 are provided for transmitting electrical impulse data to an auxiliary indicator or control system, i. e., the circuit selectively producing the reference signals, suitable connections 30, 31 and 32 being provided for this purpose. The dotted lines 35 include the entire time discriminating relay mechanism which may be remotely located with respect to the displacement pickup mechanism. Such pickup mechanism is enclosed within the dotted lines 36 and includes a driven contact member 40 mounted to the mechanism frame by electrical insulating member 41. Contact member 45 is mounted to the mechanism frame by insulating member 46 and carries contact 47 in cooperating relation with contact 42. Contact member 50 is similarly mounted to the frame by insulating member 51 and carries contact 52 in cooperating relation with contact 43. Contact members 40, 45 and 50 are spring metal strips or may be hinged and spring loaded and bear respectively against control members as follows. Member 48 is a driving cam for contact member 40, rotating with a period $t$. Member 49 may be a stationary positioning device for contact member 45, or may be a cam rotating continuously or intermittently with a rotational period $nt$. Member 55, held to the mechanism frame by support 56, is moved by the displacement D to be measured, and thus displaces the contact member 50. The electrical contacts on members 40, 45, and 50 are spaced such that the contacts 42 and 43 on member 40 make electrical contact with the electrical contacts 47 and 52 respectively at least once during each period $t$.

As member 48 rotates, the electrical connections established between contacts 42, 47 and 43, 52 respectively periodically reset relays 10 and 20 to an energized condition. If contact 42 then separates from contact 47 before contact 43 separates from contact 52, relay 10 will be deenergized and in doing so, will close contacts 12 and 13 which keeps relay 20 energized. During successive periods $t$, relay 10 alternates between open and closed positions, and relay 20 remains closed. The alternations of the armature on relay 10 advance the ratchet wheel 15 one tooth during each period $t$ and transmit a series of impulses through contacts 17 and 18. Since relay 20 remains in a stationary closed position, shaft 26 remains stationary and contacts 27 and 28 remain open. If however contact is lost between members 43 and 52 before it is between members 42 and 47, then the opposite sequence of operation is obtained in the relay circuits, wherein relay 10 remains energized, and relay 20 alternates between open and closed positions with a series of operations of ratchet wheel 25 and a series of timed impulses between contacts 27, 28 occurring.

It will be evident from a study of the apparatus shown in the diagram that the position of the member 55 which moves in accordance with the displacement D to be measured will control the position of contact 52, and hence, with contact 47 in any one position, will be the controlling factor in determining whether contacts 52 and 43, which may be termed the displacement pair, will close and open prior or subsequent to the respective opening and closing of contacts 47 and 42 which may be termed the reference pair. As a displacement occurs upwardly in the showing in the drawing it will be evident that contacts 43 and 52 will close later and open earlier in the cycle than contacts 42 and 47; downward displacement of member 55 will result in reversing this sequence, and it thus follows that at some intermediate point the respective opening and closing times will be very nearly the same, with respective times of opening and closing thus being accurately indicative of very small displacements in the position of member 55.

A modification of the circuit of Fig. 1 is shown in Fig. 2, in which similar parts are similarly numbered and in which the driven contacts 42, 43 are respectively connected in series with the relay contacts, instead of in parallel as in Fig. 1. With this connection, the selection of impulses made by the time discriminating relays is based on the first pair of driven contacts to be closed. If contacts 42, 47 are closed first as member 40 moves upward, the circuit to relay 10 will be first established, relay 10 will close, and in doing so will open contacts 12 and 13 which will prevent relay 20 from becoming energized. Relay 10 will therefore close and open once during each interval $t$, and relay 20 will remain open. Reversal of the closure time sequence of the driven contacts will produce reversal of the relay motion just described.

It will be noted that the direction of operation of the ratchet wheels 15 and 25 in this arrangement is shown as reversed from the direction in which these wheels are operated in Fig. 1, this being for the reason that the significance of the timing impulses depends upon the time of closing of the relays rather than the opening thereof as in Fig. 1. The ratchet wheels in Fig. 2 are thus actuated upon the deenergization of the respective relays and under the force of the springs 11 and 21 respectively, these springs being selected to have sufficient force to cause proper ratchet actuation. If desired, however, the ratchets may operate in the same direction as in Fig. 1, and thus be advanced in response to the energization of the relays.

A typical train of impulses obtained from the apparatus is shown in Fig. 3. During each interval $nt$, the difference between the number of impulses produced in the two channels is related to the displacement being measured according to the shape of the output characteristic. When the displacement remains steady during successive intervals $nt$, as in Fig. 3, the impulse number difference is repeated during each successive interval $nt$. The long time summation of these successive impulse differences is therefore the time integral of the displacement. The displacement rate may be obtained by simple subtraction of the number of impulses occurring in one channel of the apparatus during one interval $nt$ from the number of impulses which occurred during the immediately preceding interval $nt$. Performance of the subtraction on a continuous basis yields a continuous measurement of displacement rate with limitations only governed by the resolution and speed of the apparatus.

Continuous absolute displacement data may be obtained by repetitive subtraction of successive impulse differences during successive intervals $nt$.

A typical output characteristic is shown diagrammatically in Fig. 4 for the condition of no rotation of member 49, wherein the difference between the number of impulses produced by the two relays during a constant time interval $nt$ for each specific value of displacement is plotted as ordinates against the actual displacement as abscissae. When $n$ equals 1, the apparatus can produce only one decision as the displacement varies through the transition point. When $n$ is a large number, both types of decisions are produced during the interval $nt$ for very small displacements from the transition point, since random contact sparking and other effects are modulating the instant at which contact between members 43 and 52 is lost. A curve such as shown by the dotted line of Fig. 4, plotted to a greatly expanded displacement scale is then obtained. In one case, the total displacement width of such a curve, within which both types of decisions were present, was .00004 inch.

In order to utilize the above apparatus for the measurement of larger displacements, member 45 is displaced with a periodic function of time by member 49 which may be a cam shaped in a particular way to produce any desired shape of the output characteristic. For one simple case where the driving function of member 45 is sinusoidal, the output characteristic in terms of "impulse difference during $nt$" vs. "displacement" approaches an arc sin function as $n$ approaches infinity between the limits of displacement of member 45, as shown in Fig. 5. The discrete steps in the output characteristic are caused by the motion of member 45 during the rest period of the mechanism, which precludes the production of a decision over that range of motion. For the case where $n$ is not an integer, the apparatus scans over that range of motion during successive intervals $nt$ and thus produces a measurement which oscillates within the limits of one step with a period depending on the value of $n$.

Test data on a particular model constructed to observe this output characteristic were as follows:

$t = 1$ sec.
$n = 60$
Peak displacement of contact member $47 = .030''$
Delineated displacement of contact member $52 = .030''$
Number steps on output characteristics $= 31$
Displacement per step (average) $= .0009''$ Fig. 6 shows a typical output characteristic obtained when member 49 is shaped to produce linear displacement of contact 47 with respect to time. In this case, the steps are of equal height, and the general shape of the output characteristic is linear throughout the delineated displacement range.

A typical application of the invention for automatic temperature control is shown in Fig. 7. Tests conducted on a particular model showed the apparatus capable of maintaining the temperature of the sensitive element constant within plus or minus .1° F. Response time for 90% correction to a step function of 1° F. was approximately 3 minutes. In Fig. 7, members 50 and 55 of Fig. 1 are replaced by a bi-metal helix 60 for converting temperature changes into displacement. Electrical contact 52 is fixed to the free end of the helix as shown, and the apparatus circuit remains as in Fig. 1. An auxiliary motor 61 having field windings 61A and 61B, driven in one direction by impulses from relay 10 and in the other direction by impulses from relay 29, is mechanically coupled through a gear train 62 to a rheostat 63. The current flow through heater 64 in thermal relation with helix 60 is controlled by the rheostat. The apparatus arrangement as described above results in an automatic integral control system which seeks the proper value of current for the heater coil which will maintain the selected temperature. This condition is achieved when the difference in impulse numbers from the two channels of the apparatus is consistently zero, for which there is no average motion of the rheostat in one direction or the other. Provision of the proper amount of back-lash in the gear reduction 62 equal to the rheostat rotation produced by $n/2$ decisions allows the rheostat to remain stationary until a decision is made that correction is required.

As shown in Fig. 7 cams 48 and 49 may be driven from a common drive source 66 such as an electric motor, cam 49 being suitably operated in predetermined coordinated relation with cam 48 but at a different speed through a gear reduction indicated at 67.

In the selection of a displacement detector for a particular measuring or control problem, the following characteristics are usually considered:

*Displacement resolution.*—The ability of the device to detect the smallest required increment of displacement.

*Displacement range.*—The total range of displacement over which the detector indicates that a displacement has occurred.

*Detection time.*—The time required for the device to detect the smallest required increment of displacement.

*Output characteristic.*—The shape of the curve describing the relation between the displacement and the output signal.

*Null sensitivity.*—The slope of the output characteristic at zero output signal.

The invention described herein offers considerable flexibility for selecting the optimum apparatus parameters as indicated below:

*Displacement resolution.*—Increased by increasing $n$ and decreasing modulation of member 45.

*Displacement range.*—Increased by increasing modulation of member 45.

*Detection time.*—Decreased by decreasing value of $t$.

*Output characteristic.*—Controlled by the shape of the driving function of member 45.

*Null sensitivity.*—May be made any value from zero to infinity by selecting $n$, phase angle between member 40 and member 45 driving functions, and amplitude of member 45 modulation.

It is shown in Fig. 5 that the null sensitivity is infinite when $n$ equals 20 and the phase angle between the two driving functions is zero degrees. This condition can only obtain in the perfect case when $n/2$ is even, and the decision instants are perfectly symmetrical on the contact member 45 driving function. This condition can be approached, however, by averaging a series of measurements at the null point, which is equivalent to saying that the null sensitivity increases with time. Other modifications of the null sensitivity can be obtained by adjustment of the phase angle mentioned above.

The normal condition of zero null sensitivity as shown in Fig. 6 for the curve $n$ equal 10 is obtained for the imperfect case of Fig. 5 and for any conditions where decisioning instants are not located on successive zeros of the member 45 driving function. The infinite null sensitivity condition is approached in the case where $n/2$ is odd and the phase angle equals 180 degrees. Obtaining this perfect condition again requires the averaging of successive measurements at the null condition to approach the infinite sensitivity condition.

In general, the phase angle points of 0 and 180 degrees are points of discontinuity in the relation between $n$ and the number of defined displacement increments. For other than these exact values of phase angle, the number of defined displacement increments is $n$ plus 1, and the defined displacements may be made equal in size throughout the displacement range in the linear modulation case by using a phase angle of 90 degrees.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for detecting and measuring displacements comprising two pairs of electrical contacts, means for periodically opening and closing said pairs of contacts, means operable in accordance with said displacement for moving one contact of one of said pairs with respect to a corresponding contact of the other said pair, a bi-stable time discriminating circuit including two electrical relays interconnected for mutually exclusive energization, means for coupling electrical signals from said contact pairs to said time discriminating circuit, and means for supplying a time sequence of impulses selectively related to the direction of said displacement from a reference position from said time discriminating circuit in accordance with the particular relay which is energized.

2. Apparatus for detecting and measuring displacements comprising two pairs of electrical contacts, means for opening and closing said contacts periodically, means operable in accordance with said displacement for moving one contact of one of said pairs with respect to a corresponding contact of the other said pair to vary the sequence of actuation of said respective pairs of contacts, a bi-stable time discriminating circuit including two electrical relays controlled respectively by said pairs of contacts and interconnected for mutually exclusive operation, means for coupling an electrical signal from said contact pairs to said time discriminating circuit, and means for extracting a time series of impulses from said time discriminating circuit selectively in accordance with the relative sequence of actuation of said pairs of contacts.

3. Apparatus for detecting and measuring displacement comprising a displacement pair of contacts, a reference pair of contacts, means for periodically moving one contact of each of said pairs to cause opening and closing of respective pairs thereof, means operable in accordance with the displacement to be measured for moving one contact of said displacement pair with respect to the corresponding contact of said reference pair to vary the relative times of actuation of said respective pairs of contacts, a relay circuit comprising interconnected electrical relays having two distinct states of stability, and means for coupling electrical signals from said contact pairs to said electrical relays to establish selective actuation of a single one of said relays depending upon the sequence of actuation of said pairs of driven contacts.

4. Apparatus for detecting and measuring displacement comprising a plurality of driven contacts, means for periodically moving said contacts to cause opening and closing of respective pairs thereof, means operable in accordance with the displacement to be measured for moving one contact of a pair with respect to the corresponding contact of said pair to vary the relative times of actuation of said respective pairs of contacts, a relay circuit comprising interconnected electrical relays having two distinct states of stability, means for coupling electrical signals from said contact pairs to said electrical relays to establish selective actuation of one of said relays depending only upon the sequence of actuation of said pairs of driven contacts and independently of the length of time said contacts are actuated, and means for obtaining impulses selectively in accordance with the actuated relay.

5. Apparatus for detecting and measuring displacement comprising two pairs of electrical contacts, means operable in accordance with a periodic function of time for displacing one of said pairs of contacts with respect to the contacts of a corresponding pair, means for periodically moving said contacts to cause opening and closing of respective pairs thereof, means operable in accordance with the displacement to be measured for moving one contact of a pair with respect to the corresponding contact of said pair to vary the relative times of the opening and closing of said respective pairs of contacts, a relay circuit comprising interconnected electrical relays having two distinct states of stability, and means for coupling electrical signals from said contact pairs to said electrical relays to establish selective actuation of a single one of said relays depending upon the sequence of actuation of said pairs of driven contacts and independently of the length of time said contacts are actuated.

6. Apparatus for detecting and measuring displacement comprising two pairs of electrical contacts, means operable periodically for moving one contact of each pair toward and away from the corresponding contacts of the other said pair, means operable in accordance with said displacement for moving one contact of one of said pairs with respect to a corresponding contact of the other said pair to vary the sequence of opening and closing of said respective pairs of contacts, means operable in accordance with a different periodic function for moving the other contact of said other pair, a bi-stable time discriminating circuit including two electrical relays controlled respectively by said pairs of contacts and interconnected for mutually exclusive operation, means for coupling an electrical signal from said contact pairs to said time discriminating circuit, and means for extracting impulses from said time discriminating circuit selectively in accordance with the relative actuation of said pairs of contacts.

7. Apparatus for detecting and measuring displacement comprising two pairs of electrical contacts, means operable periodically for moving one contact of each pair toward and away from the corresponding contacts of the other said pair, means operable in accordance with said displacement for moving one contact of said pairs with respect to the corresponding contact of the other said pair, additional means for periodically moving said corresponding contact of the other said pair in accordance with a different function of time, said respective movements of said contacts varying the sequence in which said respective contact pairs open and close, means for supplying electrical signals from said contact pairs, and means controlled by said electrical signals forming an indication of said displacement.

8. Apparatus for detecting and measuring displacement comprising two pairs of electrical contacts, means operable periodically for moving one contact of each pair toward and away from the corresponding contacts of the other said pair, means operable in accordance with said displacement for moving one contact of said pairs with respect to the corresponding contact of the other said pair, additional means for periodically moving said corresponding contact of the other said pair in accordance with a different periodic function, said respective movements of said contacts varying the sequence in which said respective contact pairs open and close, a bi-stable time discriminating circuit including two electrical relays interconnected for mutually exclusive energization, means for coupling electrical signals from said contact pairs to said time discriminating circuit, and means controlled by said relays for producing selective impulses from said respective relays corresponding to said displacement.

9. Apparatus for detecting and measuring displacement comprising two pairs of electrical contacts, means operable in accordance with a periodic function of time for displacing one of said pairs of contacts with respect to the contacts of a corresponding pair, means for periodically moving said contacts to cause opening and closing of respective pairs thereof, means operable in accordance with the displacement to be measured for moving one contact of a pair with respect to the corresponding contact of said pair to vary the relative times of the opening and closing of said respective pairs of contacts, means for additionally displacing one contact of the other said pairs in accordance with another function of time, a relay circuit comprising interconnected electrical relays having two distinct states of stability, means for coupling electrical signals from said contact pairs to said electrical relays to establish actuation of a selected one of said relays depending upon the sequence of actuation of said pairs of driven contacts.

10. Apparatus for detecting and measuring displacement by producing two trains of impulses in two separate electric circuits in which the difference in the number of impulses in the two circuits during a predetermined time interval is a function of said displacement, said apparatus comprising first and second pairs of electric contacts, means for normally fixing one contact of the first pair in a reference position, means for periodically displacing one contact of each of said first and second pairs with respect to a reference position, means for displacing the second contact of the second pair from a reference position in accordance with the displacement to be measured, a time discriminating relay circuit including first and second relays connected for bi-stable mutually exclusive actuation, and means for supplying impulses from said respective pairs of contacts to said time discriminating relay circuit providing for selective actuation of one of said relays in accordance with the relative timing of the actuation of said respective pairs of contacts and for simultaneous non-actuation of the other of said relays.

11. Apparatus for detecting and measuring displacement by producing two trains of impulses in two separate electric circuits in which the difference in the number of impulses in the two circuits during a predetermined time interval is a function of said displacement, said apparatus comprising first and second pairs of electric contacts, means for normally fixing one contact of the first pair in a reference position, means for periodically displacing one contact of each of said first and second pairs with respect to a reference position, means for displacing the second contact of the second pair from a reference position in accordance with the displacement to be measured, additional means for displacing one contact of said first pair from its normal reference position in accordance with a periodic function of time, a time discriminating relay circuit including first and second relays connected for bi-stable mutually exclusive actuation, and means for supplying impulses from said respective pairs of contacts to said time discriminating relay circuit providing for selective actuation of one or the other of said relays in accordance with the timing of the actuation of said respective pairs of contacts.

12. Apparatus for detecting and measuring displacement by producing two trains of impulses in two separate electric circuits in which the difference in the number of impulses in the two circuits during a predetermined time interval is a function of said displacement independently of the length of such intervals, said apparatus comprising first and second pairs of electric contacts, means for normally fixing one contact of the first pair in a reference position, means for periodically displacing one contact of each of said first and second pairs with respect to a reference position, means for displacing the second contact of the second pair from a reference position in accordance with the displacement to be measured, a time discriminating relay including first and second relays, an energizing circuit for each of said relays, means for completing said energizing circuit for each relay only when the other relay is deenergized, and means for including said pairs of driven contacts in the respective energizing circuits for said relays to effect energization of one or the other of said relays selectively in accordance with the relative timing of the actuation of said contacts.

13. Apparatus for detecting and measuring displacement by producing two trains of impulses in two separate electric circuits in which the difference in the number of impulses in the two circuits during a predetermined time interval is a function of said displacement, said apparatus comprising first and second pairs of electric contacts, means for normally fixing one contact of the first pair in a reference position, means for periodically displacing one contact of each of said first and second pairs with respect to a reference position, means for displacing the second contact of the second pair from a reference position in accordance with the displacement to be measured, a time discriminating relay including first and second relays, an energizing circuit for each of said relays, means for completing said energizing circuit for each relay only when the other relay is deenergized, means for including said pairs of driven contacts in the respective energizing circuits for said relays to effect energization of a single one or the other of said relays selectively in accordance with the relative timing of the actuation of said contacts, and additional means selectively actuated upon the energization of said respective relays forming an indication corresponding to the degree of said displacement.

MAURICE E. BUEHLER.

REFERENCES CITED

The following references are of record in the file of this patent:

UNITED STATES PATENTS

| Number | Name | Date |
|---|---|---|
| 2,231,568 | Gorrie | Feb. 11, 1941 |